US012717223B2

(12) United States Patent
Nomura et al.

(10) Patent No.: US 12,717,223 B2
(45) Date of Patent: Aug. 25, 2026

(54) ILLUMINATION DEVICE, METHOD OF CONTROLLING ILLUMINATION DEVICE, AND PROJECTION DISPLAY APPARATUS

(71) Applicant: Sony Group Corporation, Tokyo (JP)

(72) Inventors: Tsuneharu Nomura, Tokyo (JP); Shiun Sakai, Tokyo (JP); Chiharu Suzuki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 460 days.

(21) Appl. No.: 18/020,751

(22) PCT Filed: Jul. 27, 2021

(86) PCT No.: PCT/JP2021/027809
§ 371 (c)(1),
(2) Date: Feb. 10, 2023

(87) PCT Pub. No.: WO2022/034793
PCT Pub. Date: Feb. 17, 2022

(65) Prior Publication Data
US 2023/0305380 A1 Sep. 28, 2023

(30) Foreign Application Priority Data
Aug. 13, 2020 (JP) ................................ 2020-136772

(51) Int. Cl.
*G03B 21/20* (2006.01)
*H04N 9/31* (2006.01)
*H05B 47/17* (2020.01)

(52) U.S. Cl.
CPC ......... *G03B 21/2053* (2013.01); *H05B 47/17* (2020.01)

(58) Field of Classification Search
CPC .............. G03B 21/2053; G03B 21/204; H04N 9/3155; H04N 9/3161
See application file for complete search history.

(56) References Cited

U.S. PATENT DOCUMENTS

| | | | | |
|---|---|---|---|---|
| 9,781,795 | B1 | 10/2017 | Lin | |
| 10,109,223 | B2 | 10/2018 | Mitsuhashi | |
| 2008/0165815 | A1* | 7/2008 | Kamijima | H01S 5/14 372/34 |
| 2008/0291405 | A1* | 11/2008 | Nagate | H04N 9/3155 353/85 |
| 2012/0099084 | A1 | 4/2012 | Toyooka | |

(Continued)

FOREIGN PATENT DOCUMENTS

| | | | |
|---|---|---|---|
| CN | 108073026 | A | 5/2018 |
| CN | 105513563 | B | 10/2018 |

(Continued)

OTHER PUBLICATIONS

International Search Report from corresponding PCT application PCT/JP2021/027809, dated Oct. 12, 2021.

*Primary Examiner* — Ryan D Howard
(74) *Attorney, Agent, or Firm* — K&L Gates LLP

(57) ABSTRACT

An illumination device according to an embodiment of the present disclosure includes: a light source section; and a control unit. The light source section includes one or more solid-state light sources. The control unit controls driving of the one or more solid-state light sources to control luminance for a predetermined time after activation of the light source section.

17 Claims, 6 Drawing Sheets

(56) References Cited

U.S. PATENT DOCUMENTS

| | | | | |
|---|---|---|---|---|
| 2016/0211648 | A1* | 7/2016 | Shimizu | H01S 5/06804 |
| 2019/0043394 | A1* | 2/2019 | Mitsuhashi | G09G 3/346 |

FOREIGN PATENT DOCUMENTS

| | | | |
|---|---|---|---|
| JP | 2004070298 | A | 3/2004 |
| JP | 2013251131 | A | 12/2013 |
| JP | 2020064167 | A | 4/2020 |
| TW | I636283 | B | 9/2018 |
| WO | 2016002119 | A1 | 1/2016 |
| WO | WO-2016084192 | A1 | 6/2016 |

* cited by examiner

[ FIG. 1 ]
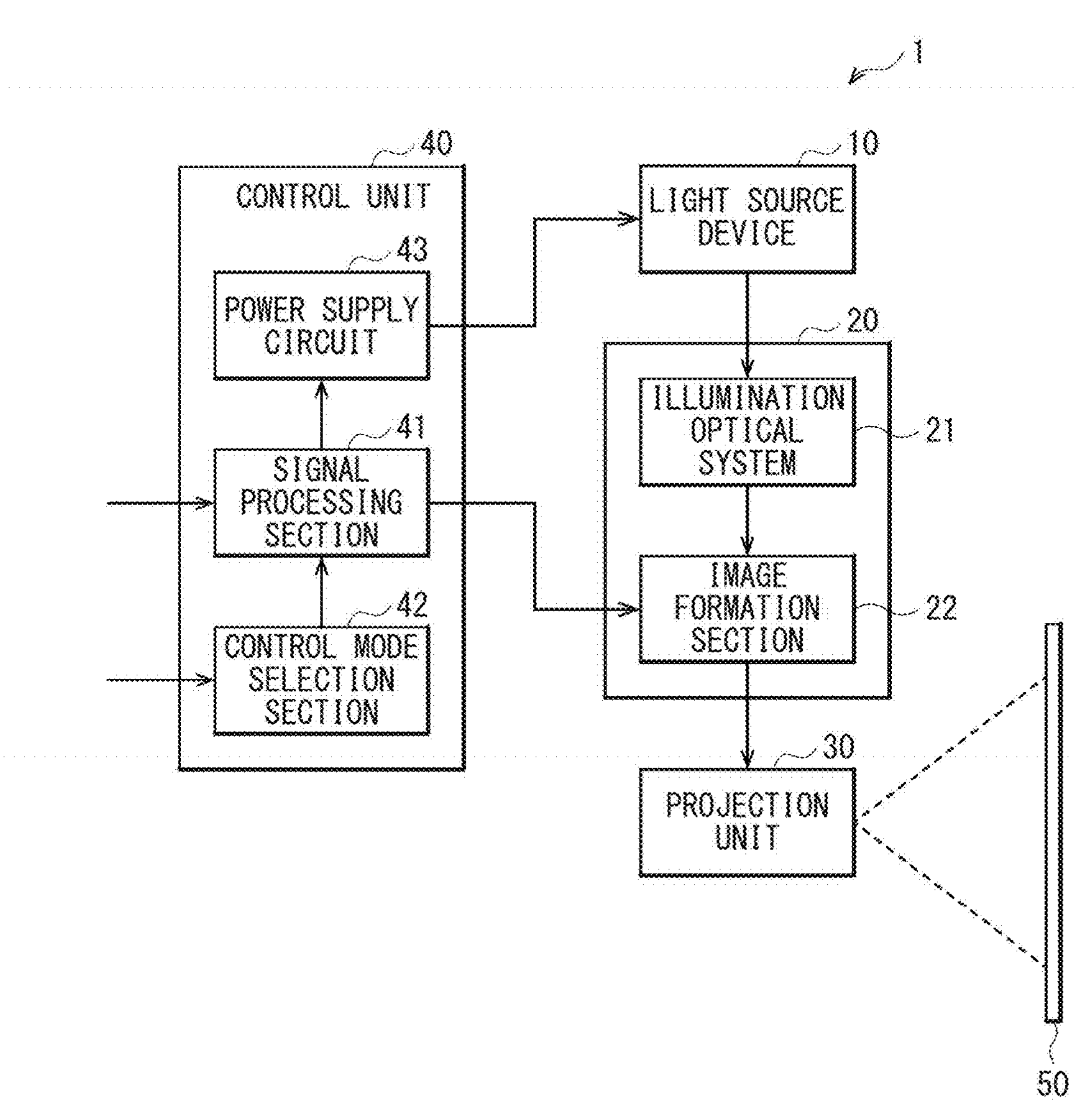

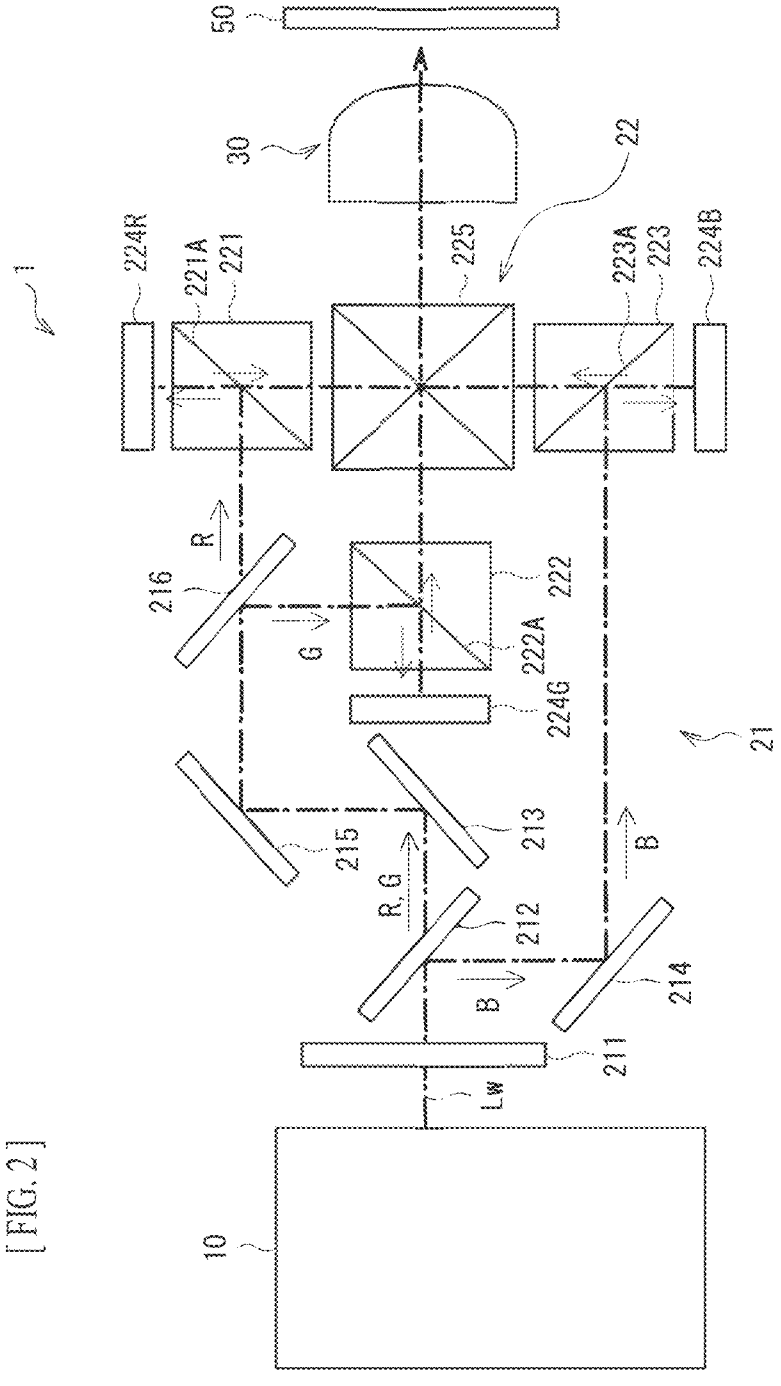
[FIG. 2]
1
10
Lw
211
212
213
214
215
216
21
22
221
221A
222
222A
223
223A
224R
224G
224B
225
30
50
R
G
B
R, G

[ FIG. 3 ]
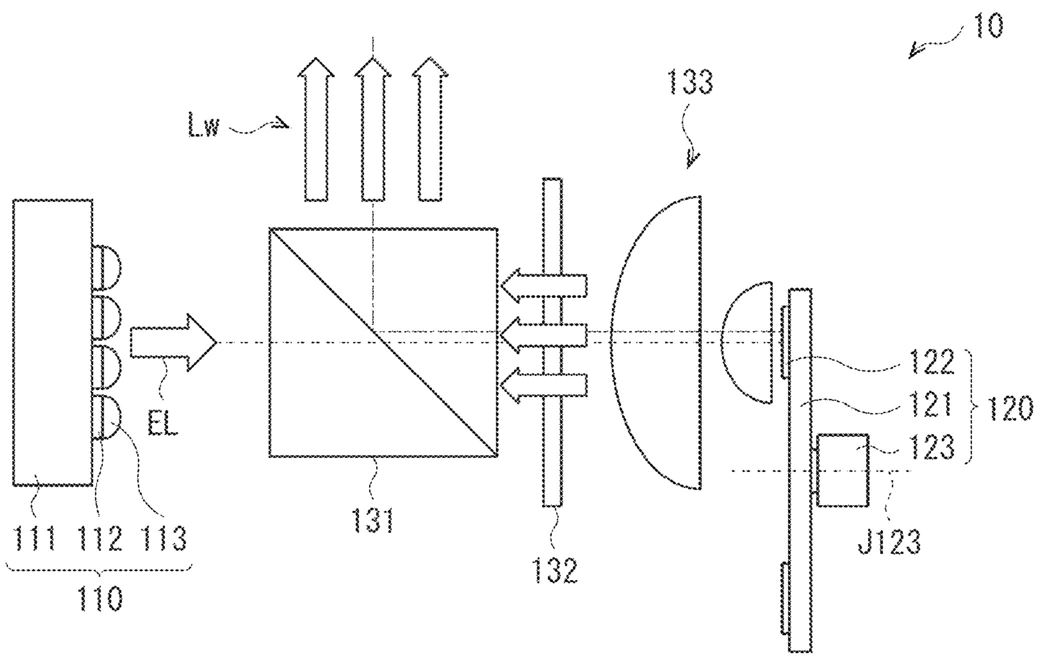
[ FIG. 4 ]
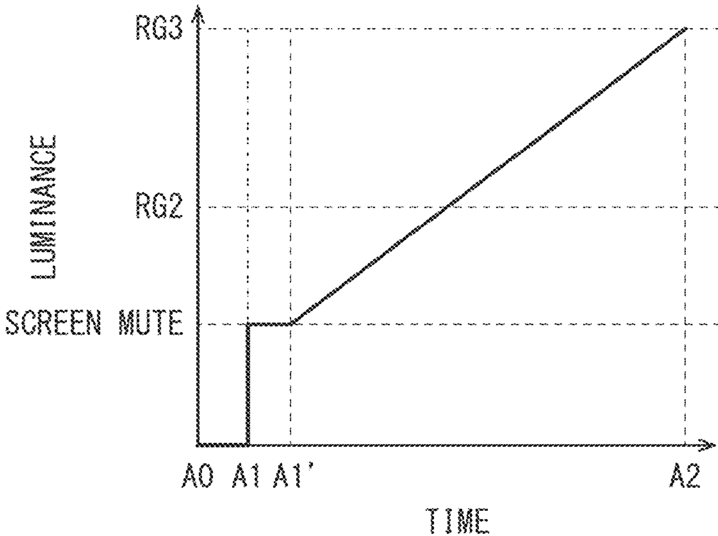

[ FIG. 5 ]
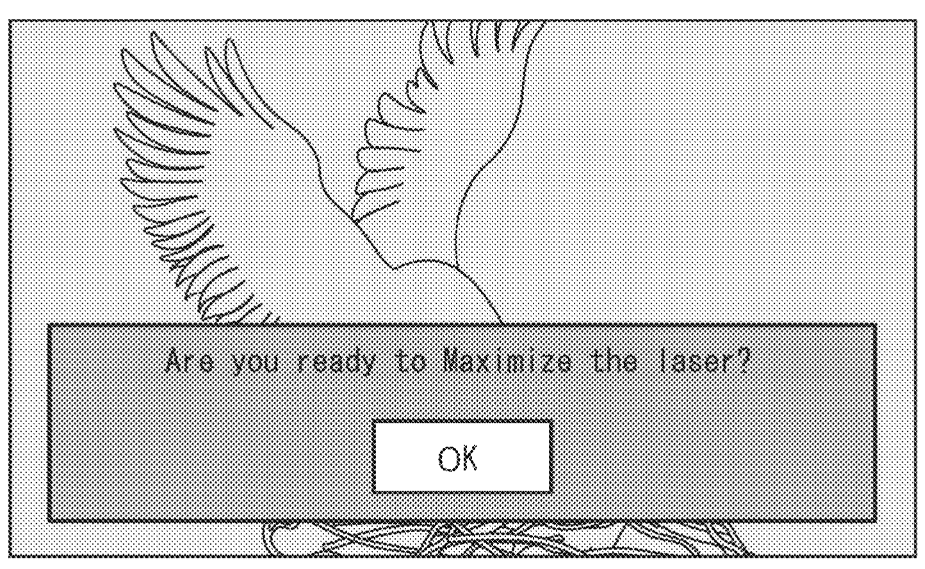
[ FIG. 6 ]
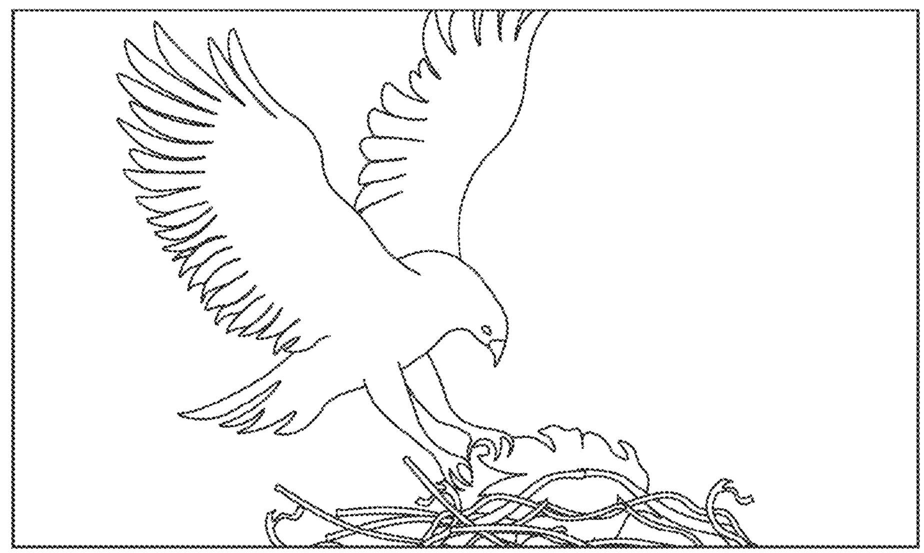

[ FIG. 7 ]
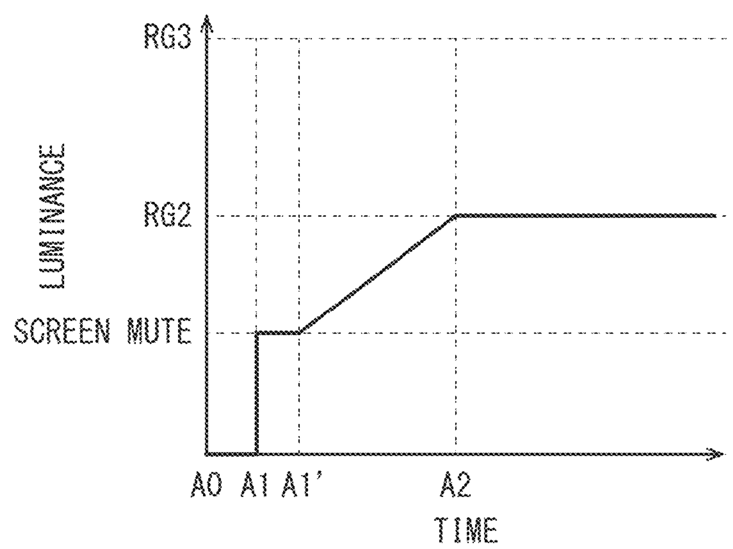

[ FIG. 8 ]
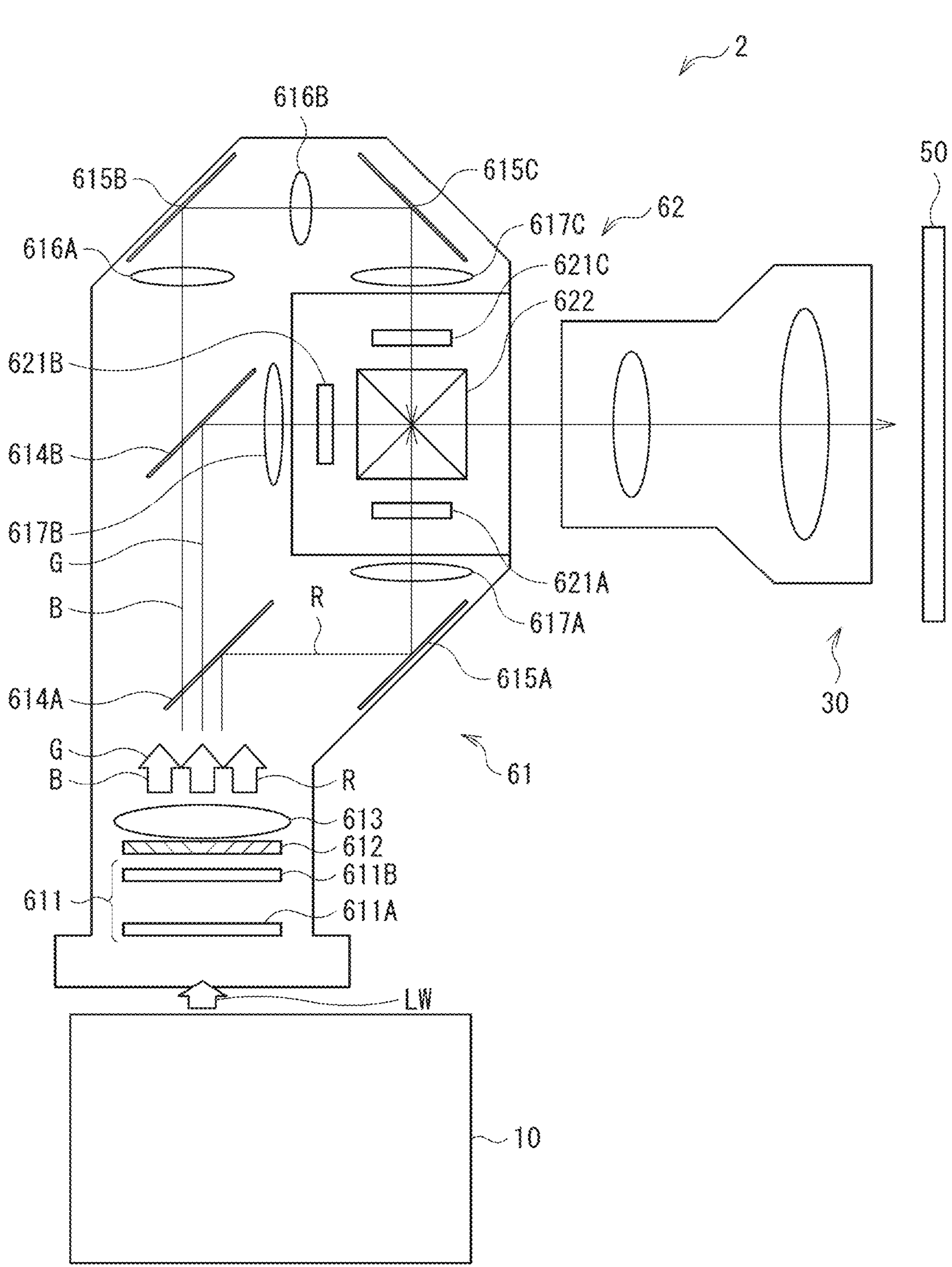

ILLUMINATION DEVICE, METHOD OF CONTROLLING ILLUMINATION DEVICE, AND PROJECTION DISPLAY APPARATUS

TECHNICAL FIELD

The present disclosure relates, for example, to an illumination device in which one or more solid-state light sources are used as light sources, a method of controlling an illumination device, and a projection display apparatus including this illumination device.

BACKGROUND ART

For example, PTL 1 discloses an image display apparatus including a calculator and a notification section. The calculator calculates a reference distance from an emission surface. The reference distance serves as a determination criterion for the influence of emission light that is emitted from a projection section. The notification section issues a notification of information regarding the influence of the emission light on the basis of the calculated reference distance.

CITATION LIST

Patent Literature

PTL 1: International Publication No. WO 2016/002119

SUMMARY OF THE INVENTION

Incidentally, in recent years, projectors have found wider application. The projectors are requested to increase in merchantability.

It is desirable to provide an illumination device, a method of controlling an illumination device, and a projection display apparatus that are each allowed to increase in merchantability.

An illumination device according to an embodiment of the present disclosure includes: a light source section; and a control unit. The light source section includes one or more solid-state light sources. The control unit controls driving of the one or more solid-state light sources to control luminance for a predetermined time after activation of the light source section.

A method of controlling an illumination device according to an embodiment of the present disclosure includes controlling driving of one or more solid-state light sources included in a light source section to control luminance for a predetermined time after activation of the light source section.

A projection display apparatus according to an embodiment of the present disclosure includes: a light source device; an image generation optical system; and a projection unit. The image generation optical system generates image light by modulating light from the light source device on the basis of an inputted image signal. The projection unit projects projection light generated by the image generation optical system. The light source device mounted in this projection display apparatus includes the same components as those of the illumination device according to the embodiment of the present disclosure described above.

In the illumination device according to the embodiment of the present disclosure, the method of controlling an illumination device according to the embodiment, and the projection display apparatus according to the embodiment, the driving of the one or more solid-state light sources included in the light source section is controlled to control the luminance for the predetermined time after the activation of the light source section. This suppresses the intensity of light radiated from the illumination device and the projection display apparatus including this illumination device for a certain time after the activation.

BRIEF DESCRIPTION OF DRAWING

FIG. 1 is a block diagram illustrating an example of a configuration of a projector according to an embodiment of the present disclosure.

FIG. 2 is an outline diagram illustrating an example of the configuration of the projector illustrated in FIG. 1.

FIG. 3 is an outline diagram illustrating an example of a configuration of a light source device illustrated in FIG. 1.

FIG. 4 is a diagram describing a first control mode and illustrating changing luminance.

FIG. 5 is a diagram describing a second control mode and illustrating a projection image immediately after activation.

FIG. 6 is a diagram describing the second control mode and illustrating a projection image after menu selection.

FIG. 7 is a diagram describing a third control mode and illustrating the changing luminance.

FIG. 8 is an outline diagram illustrating another example of the configuration of the projector illustrated in FIG. 1.

MODES FOR CARRYING OUT THE INVENTION

The following describes an embodiment of the present disclosure in detail with reference to the drawings. The following description is a specific example of the present disclosure, but the present disclosure is not limited to the following modes. In addition, the present disclosure is not limited to the disposition, dimensions, dimensional ratios, or the like of the respective components illustrated in the drawings. It is to be noted that description is given in the following order.

1. Embodiment (An example of a projector having a plurality of control modes)
   1-1. Configuration of Projector
   1-2. Method of Controlling Light Source Device
   1-3. Workings and Effects
2. Modification Example (Another example of a projector)

1. Embodiment

FIG. 1 is a block diagram illustrating an example of a configuration of a projection display apparatus (projector 1) according to an embodiment of the present disclosure. The projector 1 enlarges a projection image (projection light) and projects the projection image (projection light) onto a projection surface (e.g., a screen 50) such as a wall surface. The projection image (projection light) has a smaller size than that of an image (projection image) to be projected. The projection image (projection light) is generated by a display device. It is to be noted that the "image" here includes a still image and a moving image. The projector 1 includes, for example, a light source device 10, an image generation system 20, a projection unit 30, and a control unit 40. The projector 1 according to the present embodiment has, for example, a plurality of control modes in which the driving of a plurality of solid-state light emitters 112 (see FIG. 3) of a light source section 110 (see FIG. 3) included in the light source device 10 is controlled to control the luminance (the intensity of light emitted from the light source device 10), for example, for a predetermined time after the activation of the light source section 110.

1-1. Configuration of Projector

As described above, the projector 1 includes the light source device 10, the image generation system 20, the projection unit 30, and the control unit 40. The image generation system 20 includes, for example, an illumination optical system 21 and an image formation section 22. This illumination optical system 21 and this image formation section 22 each correspond to a specific example of an "image generation optical system" according to the present disclosure. The control unit 40 includes, for example, a signal processing section 41, a control mode selection section 42, and a power supply circuit 43.

FIG. 2 is an outline diagram illustrating an example of a configuration of a reflective 3LCD projector as an example of the configuration of the projector 1. The reflective 3LCD projector modulates light by using a reflective liquid crystal panel (LCD).

FIG. 3 illustrates an example of a configuration of the light source device 10. The light source device 10 includes, for example, the light source section 110, a phosphor wheel 120, a polarizing beam splitter (PBS) 131, a quarter-wave plate 132, and a condensing optical system 133. As the component members included in the light source device 10, the PBS 131, the quarter-wave plate 132, and the condensing optical system 133 are disposed on the optical path of light (excitation light EL) emitted from the light source section 110 between the light source section 110 and the phosphor wheel 120 in this order from the light source section 110 side.

The light source section 110 includes, for example, the plurality of solid-state light emitters 112 as light sources. Each of the plurality of solid-state light emitters 112 emits light (excitation light EL) having a predetermined wavelength band. The plurality of solid-state light emitters 112 is disposed on a base portion 111, for example, in an array.

The base portion 111 is for supporting the plurality of solid-state light emitters 112 and prompting the plurality of solid-state light emitters 112 heated by light emission to dissipate heat. It is therefore preferable that the base portion 111 be formed by using a material having high thermal conductivity. The base portion 111 is formed by using, for example, aluminum (Al), copper (Cu), iron (Fe), and the like.

For example, semiconductor lasers (Laser Diodes: LDs) are used for the plurality of solid-state light emitters 112. Specifically, for example, LDs are used that each oscillate laser light (blue light) having a wavelength band of wavelengths of 400 nm to 470 nm, which corresponds to blue. In addition, light emitting diodes (Light Emitting Diodes: LEDs) may also be used as the plurality of solid-state light emitters 112.

The plurality of solid-state light emitters 112 has a plurality of respective lenses 113 disposed above the solid-state light emitters 112. The plurality of lenses 113 is, for example, collimating lenses. The plurality of lenses 113 adjusts pieces of laser light (pieces of excitation light EL) emitted from the plurality of respective solid-state light emitters 112 to obtain pieces of parallel light and emits the pieces of parallel light.

The phosphor wheel 120 is a wavelength conversion element that converts the excitation light EL into light (fluorescent light FL) having a wavelength band different from that of the excitation light EL and emits the fluorescent light FL. The phosphor wheel 120 is provided with a phosphor layer 122 on a wheel substrate 121 that is rotatable about a rotation axis (e.g., an axis J123).

The wheel substrate 121 is for supporting the phosphor layer 122. The wheel substrate 121 has, for example, a disk shape. It is preferable that the wheel substrate 121 further have a function of a heat dissipation member. It is therefore possible to form the wheel substrate 121 by using a metal material having high thermal conductivity. In addition, it is possible to form the wheel substrate 121 by using a metal material or a ceramics material that is allowed to be mirror-finished. This suppresses a temperature increase in the phosphor layer 122, making it possible to increase the efficiency of extracting the fluorescent light FL.

The phosphor layer 122 includes a plurality of phosphor particles. The phosphor layer 122 is excited by the excitation light EL to emit light (fluorescent light FL) having a wavelength band different from the wavelength band of the excitation light EL. Specifically, the phosphor layer 122 includes phosphor particles that are each excited by blue light (excitation light EL) emitted from the light source section 110 to emit the fluorescent light FL having the wavelength band corresponding to yellow. Examples of such phosphor particles include a YAG (yttrium-aluminum-garnet)-based material. The phosphor layer 122 may further include semiconductor nanoparticles such as quantum dots, organic pigments, or the like. The phosphor layer 122 is formed to have, for example, a plate shape. The phosphor layer 122 includes, for example, a so-called ceramics phosphor or a binder phosphor. The phosphor layer 122 is formed on the wheel substrate 121, for example, continuously in the rotating circumferential direction.

For example, a motor 123 is attached to the center of the wheel substrate 121. The motor 123 drives the wheel substrate 121 to cause the wheel substrate 121 to rotate at predetermined rotation speed. This allows the phosphor wheel 120 to rotate. The irradiated position of the phosphor layer 122 with the excitation light EL changes (moves) over time at the speed corresponding to the rotation speed. This makes it possible to avoid the degradation of phosphor particles. The degradation of phosphor particles is caused by irradiating the same position on the phosphor layer 122 with excitation light for a long period of time.

The PBS 131 separates the excitation light EL coming from the light source section 110 and the multiplexed light (e.g., white light Lw) coming from the phosphor wheel 120 side. Specifically, the PBS 131 emits the excitation light EL coming from the light source section 110 toward the quarter-wave plate 132. In addition, the PBS 131 reflects the white light Lw toward the illumination optical system 21. The white light Lw comes from the phosphor wheel 120 side through the condensing optical system 133 and the quarter-wave plate 132.

The quarter-wave plate 132 is a phase difference element that causes incident light to have a phase difference of $\pi/2$. In a case where the incident light is linearly polarized light, the quarter-wave plate 132 converts the linearly polarized light into circularly polarized light. In a case where the incident light is circularly polarized light, the quarter-wave plate 132 converts the circularly polarized light into linearly polarized light. The linearly polarized excitation light EL coming from the PBS 131 is converted by the quarter-wave plate 132 into the circularly polarized excitation light EL. In addition, a circularly polarized excitation light component included in the white light Lw coming from the phosphor wheel 120 side is converted by the quarter-wave plate 132 into linearly polarized light.

The condensing optical system 133 condenses, in a predetermined spot diameter, the excitation light EL coming from the quarter-wave plate 132 and emits the excitation light EL toward the phosphor wheel 120. In addition, the condensing optical system 133 converts the white light Lw coming from the phosphor wheel 120 side into parallel light and emits the parallel light toward the quarter-wave plate 132. It is to be noted that the condensing optical system 133 may include, for example, one collimating lens or may have a configuration in which incident light is converted into parallel light by using a plurality of lenses.

The configuration of an optical member that separates the excitation light EL coming from the light source section 110 and the white light Lw coming from the phosphor wheel 120 side is not limited to the PBS 131. It is possible to use any optical member having a configuration that is able to achieve the operation of separating light described above. In addition, the light source device 10 does not have to include all of the optical members illustrated in FIG. 3. The light source device 10 may include another optical member. For example, the light source device 10 may include a plurality of phosphor wheels.

The illumination optical system 21 includes a PS converter 211, dichroic mirrors 212 and 216, and total reflection mirrors 213, 214, and 215 along the optical axis of the white light Lw emitted from the light source device 10. The image formation section 22 includes PBSs 221, 222, and 223, reflective liquid crystal panels 224R, 224G, and 224B, and a cross prism 225. The cross prism 225 serves as a color combination means. The projection unit 30 projects the combined light emitted from the cross prism 225 toward the screen 50.

The PS converter 211 functions to polarize and transmit the white light Lw coming from the light source device 10. Here, the PS converter 211 transmits S-polarized light as it is and converts P-polarized light into S-polarized light.

The dichroic mirror 212 has a function of separating the white light Lw passing through the PS converter 211 into blue light B and the other color light (red light R and green light G). The total reflection mirror 213 reflects the color light (the red light R and the green light G) passing through the dichroic mirror 212 toward the total reflection mirror 215. The total reflection mirror 215 reflects the reflection light (the red light R and the green light G) from the total reflection mirror 213 toward the dichroic mirror 216. The dichroic mirror 216 has a function of separating the color light (the red light R and the green light G) coming from the total reflection mirror 215 into the red light R and the green light G. The total reflection mirror 214 reflects the blue light B separated by the dichroic mirror 212 toward the PBS 223.

The PBSs 221, 222, and 223 are respectively disposed along the optical paths of the red light R, the green light G, and the blue light B. The PBSs 221, 222, and 223 respectively have polarization separation surfaces 221A, 222A, and 223A. The PBSs 221, 222, and 223 have functions of separating the pieces of respective incident color light into two polarization components orthogonal to each other on these polarization separation surfaces 221A, 222A, and 223A. Each of the polarization separation surfaces 221A, 222A, and 223A reflects one (e.g., the S-polarized component) of the polarization components and transmits the other polarization component (e.g., the P-polarized component).

The reflective liquid crystal panels 224R, 224G, and 224B respectively receive pieces of color light (the red light R, the green light G, and the blue light B) having the predetermined polarization components (e.g., the S-polarized components) separated on the polarization separation surfaces 221A, 222A, and 223A. The reflective liquid crystal panels 224R, 224G, and 224B are driven in accordance with drive voltages provided on the basis of image signals. The reflective liquid crystal panels 224R, 224G, and 224B function to modulate pieces of incident light and reflect the modulated pieces of color light (the red light R, the green light G, and the blue light B) toward the PBSs 221, 222, and 223, respectively.

The cross prism 225 combines the pieces of color light (the red light R the green light G, and the blue light B) having the predetermined polarization components (e.g., the P-polarized components) emitted from the reflective liquid crystal panels 224R, 224G, and 224B and passing through the PBSs 221, 222, and 223. The cross prism 225 emits the combined color light toward the projection unit 30.

The projection unit 30 includes, for example, a plurality of lenses and the like. The projection unit 30 enlarges the combined light (projection light) coming from the image formation section 22 and projects the combined light (projection light) onto the screen 50.

As described above, the control unit 40 includes the signal processing section 41, the control mode selection section 42, and the power supply circuit 43. The control unit 40 further includes, for example, CPU (Central Processing Unit), ROM (Read Only Memory), RAM (Random Access Memory), and the like (none of which are illustrated). The CPU reads out a control program stored in the ROM and deploys the control program in the RAM. The CPU executes a step of this program on the RAM. The control unit 40 controls the entire operation of the projector 1 by this program execution by the CPU.

The signal processing section 41 performs various kinds of signal processing from an image signal inputted, for example, from an external apparatus such as a computer, a DVD player, or a TV tuner. The signal processing section 41 resizes an image, makes a gamma adjustment for an image, or makes a color adjustment for an image, for example, by correcting the characteristics of the image signal or amplifying the image signal. In addition, the signal processing section 41 decomposes the image signal into respective pieces of image data of R, G, and B. In addition, the signal processing section 41 generates optical modulation signals for driving the reflective liquid crystal panels 224R, 224G, and 224B for the respective pieces of color light and supplies the optical modulation signals to a driver (not illustrated) of the image formation section 22.

A signal (control mode designation signal) is further inputted to the signal processing section 41 from the control mode selection section 42. The signal (control mode designation signal) is for designating any of a plurality of control modes described below. The signal processing section 41 generates a signal (drive current setting signal) based on the control mode designation signal inputted from the control mode selection section 42 and supplies the signal (drive current setting signal) to the power supply circuit 43. The signal (drive current setting signal) is for setting a drive current.

A selection signal is inputted to the control mode selection section 42. The selection signal allows, for example, a user to select any of a plurality of projection modes (control modes). The control mode selection section 42 generates a signal (that is referred to as control mode designation signal below) for designating any of the control modes and supplies the control mode designation signal to the signal processing section 41.

The power supply circuit 43 supplies a drive current based on the drive current setting signal inputted from the signal processing section 41 to the light source device 10 (specifically, a plurality of solid-state light emitters 12 of the light source section 110).

1-2. Method of Controlling Light Source Device

In recent years, light source devices and illumination devices in which solid-state light emitters such as LDs or LEDs are used as light sources have been gaining widespread use. Accordingly, the evaluation of the influence of pieces of light from those light source devices and those illumination devices on the human body has attracted attention. IEC 62471 series (JIS C7550) have been standardized as a method of evaluating the influence of optical radiation on the human body. IEC 62471 adopts classification of the four groups illustrated in Table 1 below.

TABLE 1

| Classification | | Degree Of Photobiological Hazard |
|---|---|---|
| Exempt Group (RG0) | — | does not pose any photobiological hazard |
| Risk Group 1 (RG1) | low risk | does not pose such a hazard that imposes normal behavioral limitations |
| Risk Group 2 (RG2) | moderate risk | does not pose a hazard that invokes an aversion feeling or thermal discomfort |
| Risk Group 3 (RG3) | high risk | pose a hazard even for momentary or brief exposure |

The projector 1 according to the present embodiment performs control to maintain the luminance (the intensity of light emitted from the light source device 10) for the predetermined time after the activation of the light source section 110 at predetermined luminance or less by controlling the driving of the plurality of solid-state light emitters 112 included in the light source device 10. For example, the projector 1 according to the present embodiment performs control to maintain the luminance at the luminance of the risk group 2 (RG2) or less. Here, the "predetermined time" refers to a time that makes it possible to avoid a hazard owing to an aversion response of a user (human). Although individual users are different in response time, it is considered that a user is able to make a response within 0.25 seconds. For example, a time of one second or longer is set in the present embodiment to allow a user to avoid a hazard easily.

In the projector 1, the control mode selection section described above has a plurality of control modes. The luminance for the predetermined time after the activation of the light source section 110 is controlled in accordance with the selection of a user. This luminance for the predetermined time after the activation of the light source section 110 is controlled, for example, by supplying drive currents to the plurality of solid-state light emitters 112. The drive currents are based on drive current setting signals inputted from the signal processing section 41. Alternatively, the luminance is controlled by using control signals supplied from the power supply circuit 43. The control signals are for performing pulse width modulation (PWM) control on power to be supplied to the plurality of solid-state light emitters 112 of the light source section 110.

The plurality of control modes includes, for example, the following three control modes (a first control mode, a second control mode, and a third control mode).

FIG. 4 illustrates the changing luminance of the light source device 10 for the predetermined time after the activation of the light source section 110 in the first control mode. The horizontal axis (time) has A0, A1, A1', and A2. Among them, the starting point (A0) represents the time point at which the light source device 10 is started. A1 represents the time point at which the plurality of solid-state light emitters 112 of the light source section 110 is turned on. A1' represents, for example, the time point at which the projector 1 is unmuted. A2 represents the subsequent time point at which the maximum luminance (e.g., luminance evaluated as that of the risk group 3 (RG3)) or setting luminance is reached.

In the first control mode, the luminance value is 0 in the period (A0-A1) before the plurality of solid-state light emitters 112 of the light source section 110 is turned on after the light source device 10 is started. In the period (A1-A1') before unmuting after the plurality of the solid-state light emitters 112 is turned on, for example, a luminance value of about 1000 ls is maintained. After that, the luminance of the light source device 10 is gradually increased for the predetermined time (A1'-A2) after the unmuting as illustrated in FIG. 4. The luminance is made constant after reaching the maximum luminance (e.g., luminance evaluated as that of the risk group 3 (RG3)) or the setting luminance.

Here, the "activation of the light source section" according to the present disclosure refers to the time point (A1) at which the plurality of solid-state light emitters 112 is turned on or the time point (A1') of unmuting, or the period (A1-A1') in between. In other words, the luminance value at this time point (A1 or A1') or in the period (A1-A1') corresponds to a "first luminance value" according to the present disclosure and the setting luminance corresponds to a "second luminance value" according to the present disclosure. In addition, the time (A1'-A2) before the setting luminance is reached after the unmuting corresponds to the "predetermined time" according to the present disclosure.

Incidentally, while the light source device 10 is on in the projector 1 until unmuting, the reflective liquid crystal panels 224R, 224G, and 224B are off. In this case, the display device (the reflective liquid crystal panels 224R, 224G, and 224B) receives no light and displays a black screen on the screen 50 (screen mute). After unmuting, an image (projection image) based on an image signal supplied from the signal processing section 41 is generated by the display device and the projection image (projection light) is projected onto the screen 50. It is to be noted that the signal switching and the channel switching in the projector 1 also correspond to the unmuting described above.

In addition, in the present embodiment, the luminance in a case where the plurality of solid-state light emitters 112 of the light source section 110 is turned on is controlled by controlling the amount of currents to be supplied from the power supply circuit 43 to the plurality of solid-state light emitters 112 and performing pulse width modulation (PWM) control on power to be supplied to the plurality of solid-state light emitters 112 of the light source section 110. This allows the luminance in a case where the plurality of solid-state light emitters 112 of the light source section 110 is turned on to be luminance lower than the laser oscillation threshold of the plurality of solid-state light emitters 112. The luminance lower than the laser oscillation threshold is classified, for example, into a lower risk group in IEC 62471 above.

Each of FIGS. 5 and 6 describes the second control mode and illustrates an example of a projection image projected, for example, by the projector 1 onto the screen 50. The second control mode is a mode in which, after the activation of the light source section 110, for example, at luminance lower than or equal to that of the risk group 2 (RG2), the luminance is switched by an operation of a user to the maximum luminance (e.g., luminance evaluated as that of the risk group 3 (RG3)) or the setting luminance.

Specifically, the light source section 110 is activated (e.g., A1, A1', or A1'-A2 in FIG. 4) at luminance lower than or equal to the luminance of the risk group 2 (RG2). As illustrated in FIG. 5, a menu (On Screen Display: OSD) screen is displayed on a projection image. This menu screen does not disappear unless, for example, a user presses "OK" with a remote control or enters a predetermined command. In a case where the user presses "OK" with the remote control or enters the predetermined command, the luminance of the light source section 110 is switched to the maximum luminance (e.g., luminance evaluated as that of the risk group 3 (RG3)) or the setting luminance. As illustrated in FIG. 6, a projection image having high luminance is projected onto the screen 50.

It is to be noted that the luminance of the light source section 110 after the user presses "OK" with the remote control or enters the predetermined command is preferably increased gradually, for example, from the luminance of the risk group 2 (RG2) to the luminance of the risk group 3 (RG3) as in the first control mode. This is not, however, limitative.

In addition, in the projector 1, the luminance in a case where the light source section 110 is activated leads to different amounts of light, for example, in spite of the same risk group 2 (RG2), depending on a projection condition (e.g., the type of lens (projection lens) of the projection unit 30). It is therefore preferable that the light source section 110 be activated at variable luminance. This makes it possible to adjust the light emitted from the projector 1 at desired intensity. This further reduces the occurrence of a risk that a user may face and increases the merchantability.

FIG. 7 illustrates the changing luminance of the light source device 10 for the predetermined time after the activation of the light source section 110 in the third control mode. The third control mode is a mode in which the plurality of solid-state light emitters 112 of the light source section 110 is constantly on at luminance (e.g., luminance lower than or equal to the luminance of the risk group (RG2)) lower than the maximum luminance. The third control mode is useful especially in a case where a user includes a target that requests special attention such as a child.

In the third control mode, for example, as in the first control mode, the luminance value is 0 in the period (A0-A1) before the plurality of solid-state light emitters 112 of the light source section 110 is turned on after the light source device 10 is started. In the period (A1-A1') before unmuting after the plurality of the solid-state light emitters 112 is turned on, a luminance value classified into a lower risk group is maintained as described above. The luminance value of the light source device 10 is then gradually increased, for example, to the luminance of the risk group (RG2) for the predetermined time (A1'-A2) after the unmuting, for example, as illustrated in FIG. 7. After that, the luminance value of the light source device 10 is made constant.

It is to be noted that it is preferable in the third control mode that the light source section 110 be activated at variable luminance as in the second control mode, depending on a projection condition (e.g., the type of lens (projection lens) of the projection unit 30). In addition, it is preferable to provide a limiter to prevent the luminance of the light source section 110 from being luminance higher than the setting amount of light (e.g., risk group (RG2)) in any case as long as the third control mode is effective. This further reduces the occurrence of a risk that a user may face as compared with the first control mode and the second control mode and further increases the merchantability.

It is possible to cancel this third control mode, for example, by a qualified person entering a predetermined command. Alternatively, it is possible to cancel the third control mode by setting the projector 1, for example, at a position (e.g., 3 m or more) higher than the height of a user to prevent the user from entering an area (hazard zone) in which, for example, projection light projected from the projector 1 may influence the human body.

The plurality of control modes (the first control mode, the second control mode, and the third control mode) of the light source device 10 included in the projector 1 has been described above. However, for example, in a case where dynamic laser control is effective in a high dynamic projector, it is preferable to prioritize a value of lower laser power.

1-3. Workings and Effects

In the light source device 10 according to the present embodiment, the driving of the plurality of solid-state light emitters 112 included in the light source section 110 is controlled to maintain the luminance of the light source device 10 for the predetermined time after the activation of the light source section 110 at a luminance value smaller than or equal to, for example, that of the risk group 2 (RG2) in IEC 62471. This makes it possible to suppress light radiated from an illumination device and a projection display apparatus including this illumination device for the certain time after the activation at desired intensity (e.g., a luminance value classified into a lower risk group).

The light source device 10 according to the present embodiment and the projector 1 including this light source device 10 thus offer favorable usability for a user, making it possible to increase the merchantability.

In addition, in the present embodiment, the luminance of the light source device 10 is controlled in the plurality of control modes (the first control mode, the second control mode, and the third control mode). Specifically, in the first control mode, the luminance of the light source device 10 is gradually increased to the maximum luminance (e.g., luminance evaluated as that of the risk group 3 (RG3)) or the setting luminance for the predetermined time after the activation of the light source section 110. In the second control mode, after the activation of the light source section 110, for example, at luminance lower than or equal to that of the risk group 2 (RG2), the luminance is switched by an operation of a user to the maximum luminance (e.g., luminance evaluated as that of the risk group 3 (RG3)) or the setting luminance. In the third control mode, the setting luminance is set to be lower than or equal to that of the risk group 2 (RG2). The light source section 110 is constantly on at the luminance lower than or equal to that of the risk group 2 (RG2). This allows a user to select the luminance of the projector 1 in accordance with the use environment. This makes it possible to further increase the merchantability of the light source device 10 and the projector 1 including this light source device 10.

Further, in the present embodiment, the amount of currents to be supplied from the power supply circuit 43 to the plurality of solid-state light emitters 112 of the light source section 110 is controlled and pulse width modulation control is performed on power to be supplied to the plurality of solid-state light emitters 112. This makes it possible to set luminance (e.g., lower than or equal to 1000 lm) lower than the laser oscillation threshold of the plurality of solid-state light emitters 112 as the luminance in a case where the light source section 110 is activated. In other words, it is possible to set the luminance (e.g., lower than or equal to 1000 lm) lower than the laser oscillation threshold of the plurality of solid-state light emitters 112 as the luminance at the time point at which the plurality of solid-state light emitters 112 is turned on. This makes it possible to further increase the merchantability of the light source device 10 and the projector 1 including this light source device 10.

Next, a modification example of the embodiment described above is described. The following assigns the same signs to components similar to those of the embodiment described above and omits descriptions thereof as appropriate.

2. Modification Example

FIG. 8 is an outline diagram illustrating an example of a configuration of a projection display apparatus (projector 2) according to a modification example of the present disclosure. The projector 2 is a transmissive 3LCD projector that modulates light by using a transmissive liquid crystal panel (LCD). The projector 2 includes, for example, the light source device 10, an illumination optical system 61, an image formation section 62, and the projection unit 30. The illumination optical system 61 and the image formation section 62 are included an image generation system.

The illumination optical system 61 includes, for example, an integrator element 611, a polarization conversion element 612, and a condensing lens 613.

The integrator element 611, as a whole, has a function of adjusting incident light with which the polarization conversion element 612 is irradiated from the light source device 10 to cause the incident light to have a uniform brightness distribution. The integrator element 611 includes a first fly eye lens 611A and a second fly eye lens 611B. The first fly eye lens 611A includes a plurality of microlenses arranged two-dimensionally. The second fly eye lens 611B includes a plurality of microlenses arranged in association with the respective microlenses of the first fly eye lens 611A one by one.

The light (white light Lw) entering the integrator element 611 from the light source device 10 is divided into a plurality of light fluxes by the microlenses of the first fly eye lens 611A. The plurality of respective light fluxes is formed on the corresponding microlenses of the second fly eye lens 611B as images. The microlenses of the second fly eye lens 611B function as secondary light sources and irradiate the polarization conversion element 612 with a plurality of pieces of parallel light having uniform luminance as plurality of pieces of incident light.

The polarization conversion element 612 has a function of causing the incident light coming through the integrator element 611 or the like to have a uniform polarization state. This polarization conversion element 612 emits light including the blue light B, the green light G, and the red light R toward the condensing lens 613 through a lens or the like that is disposed, for example, on the emission side of the light source device 10.

The illumination optical system 61 further includes dichroic mirrors 614A and 614B, mirrors 615A, 615B, and 615C, relay lenses 616A and 616B, and field lenses 617A, 617B, and 617C.

The image formation section 62 includes transmissive liquid crystal panels 621A, 621B, and 621C and a dichroic prism 662.

Each of the dichroic mirrors 614A and 614B has a property of selectively reflecting color light having a predetermined wavelength band and transmitting pieces of light having the other wavelength bands. For example, the dichroic mirror 614A selectively reflects the red light R. The dichroic mirror 614B selectively reflects the green light G of the green light G and the blue light B that have passed through the dichroic mirror 614A. The remaining blue light B passes through the dichroic mirror 614B. This separates the white light Lw emitted from the light source device 10 into a plurality of pieces of color light (the red light R, the green light G, and the blue light B) different from each other.

The separated red light R is reflected by the mirror 615A and collimated by passing through the field lens 617A. After that, the red light R enters the transmissive liquid crystal panel 621A for modulating red light. The green light G is collimated by passing through the field lens 617B. After that, the green light G enters the transmissive liquid crystal panel 621B for modulating green light. The blue light B is reflected by the mirror 615B through the relay lens 616A. Further, the blue light B is reflected by the mirror 615C through the relay lens 616B. The blue light B reflected by the mirror 615C is collimated by passing through the field lens 617C. After that, the blue light B enters the transmissive liquid crystal panel 621C for modulating the blue light B.

The transmissive liquid crystal panels 621A, 621B, and 621C are electrically coupled to an unillustrated signal source (e.g., PC or the like) that supplies image signals including image information. The transmissive liquid crystal panels 621A, 621B, and 621C modulate pieces of incident light for the respective pixels on the basis of supplied image signals of the red light R, green light G, and blue light B, respectively. The transmissive liquid crystal panels 621A, 621B, and 621C respectively generate a red color image, a green color image, and a blue color image. The pieces of modulated light (formed images) of the respective colors enter the dichroic prism 662 and are combined.

The dichroic prism 662 superimposes and combines the pieces of light of the respective colors coming from the three directions and emits the combined light toward the projection unit 30.

The projection unit 30 includes, for example, a plurality of lenses and the like. The projection unit 30 enlarges the combined light (projection light) coming from the image formation section 62 and projects the combined light (projection light) onto the screen 50.

The present technology is described above with reference to the embodiment and the modification example, but the present technology is not limited to the embodiment or the like described above. A variety of modifications are possible. For example, an apparatus other than the projectors 1 and 2 described above may be configured as the projection display apparatus according to the present technology. For example, the example has been described in which a reflective liquid crystal panel or a transmissive liquid crystal panel is used as a light modulation element in each of the projectors 1 and 2 described above, but the present technology may also be applied to a projector in which a digital micromirror device (DMD: Digital Micro-mirror Device) or the like is used.

In addition, the light source device 10 according to the present technology may be used for an apparatus that is not a projection display apparatus. For example, the light source device 10 according to the present disclosure may be used for illumination. The light source device 10 according to the present disclosure is applicable, for example, to a headlight of an automobile or a light source for lighting up.

It is to be noted that the effects described here are not necessarily limited, but any of effects described in the present disclosure may be included.

It is to be noted that the present disclosure may also have configurations as follows. According to the present technology having the following configurations, the driving of the one or more solid-state light sources included in the light source section is controlled to control the luminance for the predetermined time after the activation of the light source section. This makes it possible to suppress light radiated, for example, from the illumination device and the projection display apparatus including this illumination device for the certain time after the activation at desired intensity or less. It is thus possible to increase the merchantability.

(1)

An illumination device including:

a light source section including one or more solid-state light sources; and a control unit that controls driving of the one or more solid-state light sources to control luminance for a predetermined time after activation of the light source section.

(2)

The illumination device according to (1), in which the control unit includes a power supply circuit, and the control unit controls the luminance for the predetermined time after the activation of the light source section by controlling an amount of currents to be supplied from the power supply circuit to the one or more solid-state light sources and performing pulse width modulation control on power to be supplied to the one or more solid-state light sources.

(3)

The illumination device according to (1) or (2), in which the control unit has a plurality of control modes.

(4)

The illumination device according to (3), in which the control unit has, as the plurality of control modes, a first control mode in which the luminance is gradually increased from a first luminance value to a second luminance value for the predetermined time after the activation of the light source section.

(5)

The illumination device according to (3) or (4), in which the control unit has, as the plurality of control modes, a second control mode in which, after the activation of the light source section at a third luminance value, the luminance is increased by an operation of a user to second luminance higher than the third luminance value.

(6)

The illumination device according to any one of (3) to (5), in which the control unit has, as the plurality of control modes, a third control mode in which the light source section the predetermined time after the activation of the light source section is driven at a value lower than a maximum luminance of the light source section.

(7)

The illumination device according to any one of (1) to (6), in which luminance immediately after the activation of the light source section is 1000 lm or less.

(8)

The illumination device according to any one of (1) to (7), in which the predetermined time refers to a time of one second or longer after the activation of the light source section.

(9)

The illumination device according to any one of (1) to (8), in which the one or more solid-state light sources include a semiconductor laser or a light emitting diode.

(10)

A method of controlling an illumination device including controlling driving of one or more solid-state light sources included in a light source section to control luminance for a predetermined time after activation of the light source section.

(11)

The method of controlling the illumination device according to (10), in which the luminance is gradually increased from a first luminance value to a second luminance value for the predetermined time after the activation of the light source section.

(12)

The method of controlling the illumination device according to (10), in which, after the activation of the light source section at a third luminance value, the luminance is increased by an operation of a user to second luminance higher than the third luminance value.

(13)

The method of controlling the illumination device according to (10), in which the light source section the predetermined time after the activation of the light source section is constantly driven at a value less than maximum luminance of the light source section.

(14)

The method of controlling the illumination device according to any one of (10) to (13), in which the luminance for the predetermined time after the activation of the light source section is controlled by controlling an amount of currents to be supplied to the one or more solid-state light sources and performing pulse width modulation control on power to be supplied to the one or more solid-state light sources.

(15)

A projection display apparatus including:

a light source device;

an image generation optical system that generates image light by modulating light from the light source device on the basis of an inputted image signal; and a projection unit that projects projection light generated by the image generation optical system, in which the light source device includes a light source section including one or more solid-state light sources, and a control unit that controls driving of the one or more solid-state light sources to control luminance for a predetermined time after activation of the light source section.

This application claims the priority on the basis of Japanese Patent Application No. 2020-136772 filed with Japan Patent Office on Aug. 13, 2020, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An illumination device comprising:

a light source section including one or more solid-state light sources; and a control unit that controls driving of the one or more solid-state light sources, wherein the control unit has a plurality of control modes with each control mode is configured to control luminance for a predetermined time after activation of the light source section, including a second control mode, in which, after the activation of the light source section at a third luminance value, the luminance is increased by a luminance selection of a user, which provides the user with increased control over photobiological hazard, to a second luminance value higher than the third luminance value.

2. The illumination device according to claim 1, wherein the control unit includes a power supply circuit, and the control unit controls the luminance for the predetermined time after the activation of the light source section by controlling an amount of currents to be supplied from the power supply circuit to the one or more solid-state light sources and performing pulse width modulation control on power to be supplied to the one or more solid-state light sources.

3. The illumination device according to claim 1, wherein the control unit has, as the plurality of control modes, a first control mode in which the luminance is gradually increased from a first luminance value to the second luminance value for the predetermined time after the activation of the light source section.

4. The illumination device according to claim 1, wherein the control unit has, as the plurality of control modes, a third control mode in which the light source section the predetermined time after the activation of the light source section is driven at a value lower than a maximum luminance of the light source section.

5. The illumination device according to claim 1, wherein luminance immediately after the activation of the light source section is 1000 lm or less.

6. The illumination device according to claim 1, wherein the predetermined time refers to a time of one second or longer after the activation of the light source section.

7. The illumination device according to claim 1, wherein the one or more solid-state light sources include a semiconductor laser or a light emitting diode.

8. The illumination device according to claim 1, wherein the luminance during the predetermined time is limited to a photobiological risk group lower than a risk group associated with a maximum luminance of the light source section.

9. The illumination device according to claim 1, wherein the luminance during the predetermined time is lower than a laser oscillation threshold of the one or more solid-state light sources.

10. The illumination device according to claim 1, wherein the predetermined time corresponds to a time configured to prevent an aversion response by a user.

11. The illumination device according to claim 4, wherein the third control mode is automatically canceled when the illumination device is set at a height above a predetermined distance from a height of the user.

12. The illumination device according to claim 1, wherein the control unit includes a control mode selection section configured to receive a user selection signal and to output a selection signal identifying a selected control mode from the plurality of control modes.

13. A method of controlling an illumination device comprising controlling driving of one or more solid-state light sources in a plurality of control modes, the one or more solid-state light sources included in a light source section, wherein each control mode controls luminance for a predetermined time after activation of the light source section, wherein the plurality of control modes includes a second control mode, in which, after the activation of the light source section at a third luminance value, the luminance is increased by a luminance selection of a user, which provides the user with increased control over photobiological hazard, to a second luminance value higher than the third luminance value.

14. The method of controlling the illumination device according to claim 13, wherein the luminance is gradually increased from a first luminance value to the second luminance value for the predetermined time after the activation of the light source section.

15. The method of controlling the illumination device according to claim 13, wherein the light source section for the predetermined time after the activation of the light source section is constantly driven at a value less than maximum luminance of the light source section.

16. The method of controlling the illumination device according to claim 13, wherein the luminance for the predetermined time after the activation of the light source section is controlled by controlling an amount of currents to be supplied to the one or more solid-state light sources and performing pulse width modulation control on power to be supplied to the one or more solid-state light sources.

17. A projection display apparatus comprising:

a light source device;

an image generation optical system that generates image light by modulating light from the light source device on a basis of an inputted image signal; and a projection unit that projects projection light generated by the image generation optical system, wherein the light source device includes a light source section including one or more solid-state light sources, and a control unit that controls driving of the one or more solid-state light sources, wherein the control unit has a plurality of control modes with each control mode is configured to control luminance for a predetermined time after activation of the light source section, including a second control mode, in which, after the activation of the light source section at a third luminance value, the luminance is increased by a luminance selection of a user, which provides the user with increased control over photobiological hazard, to a second luminance value higher than the third luminance value.

* * * * *